Figure 7:
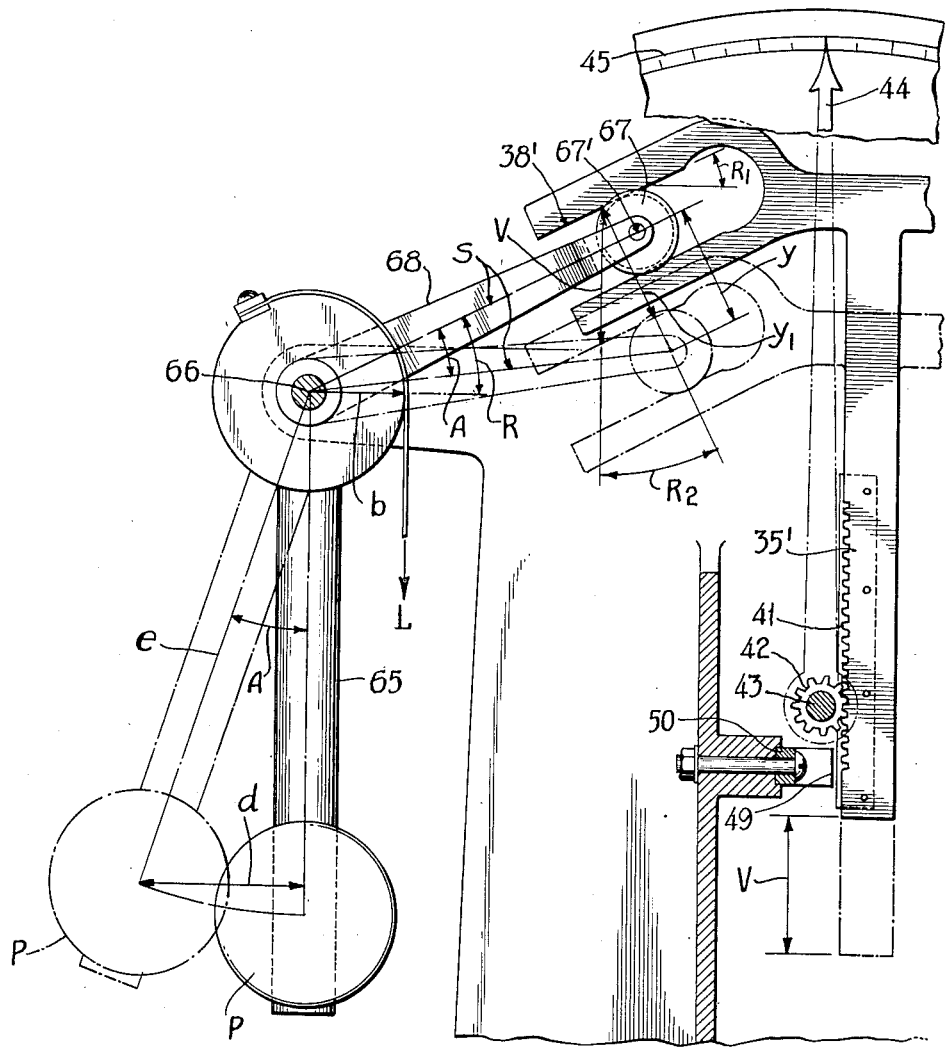

Nov. 18, 1952     C. S. SCHROEDER     2,618,476
PENDULUM SCALE
Filed Jan. 23, 1945     4 Sheets-Sheet 1
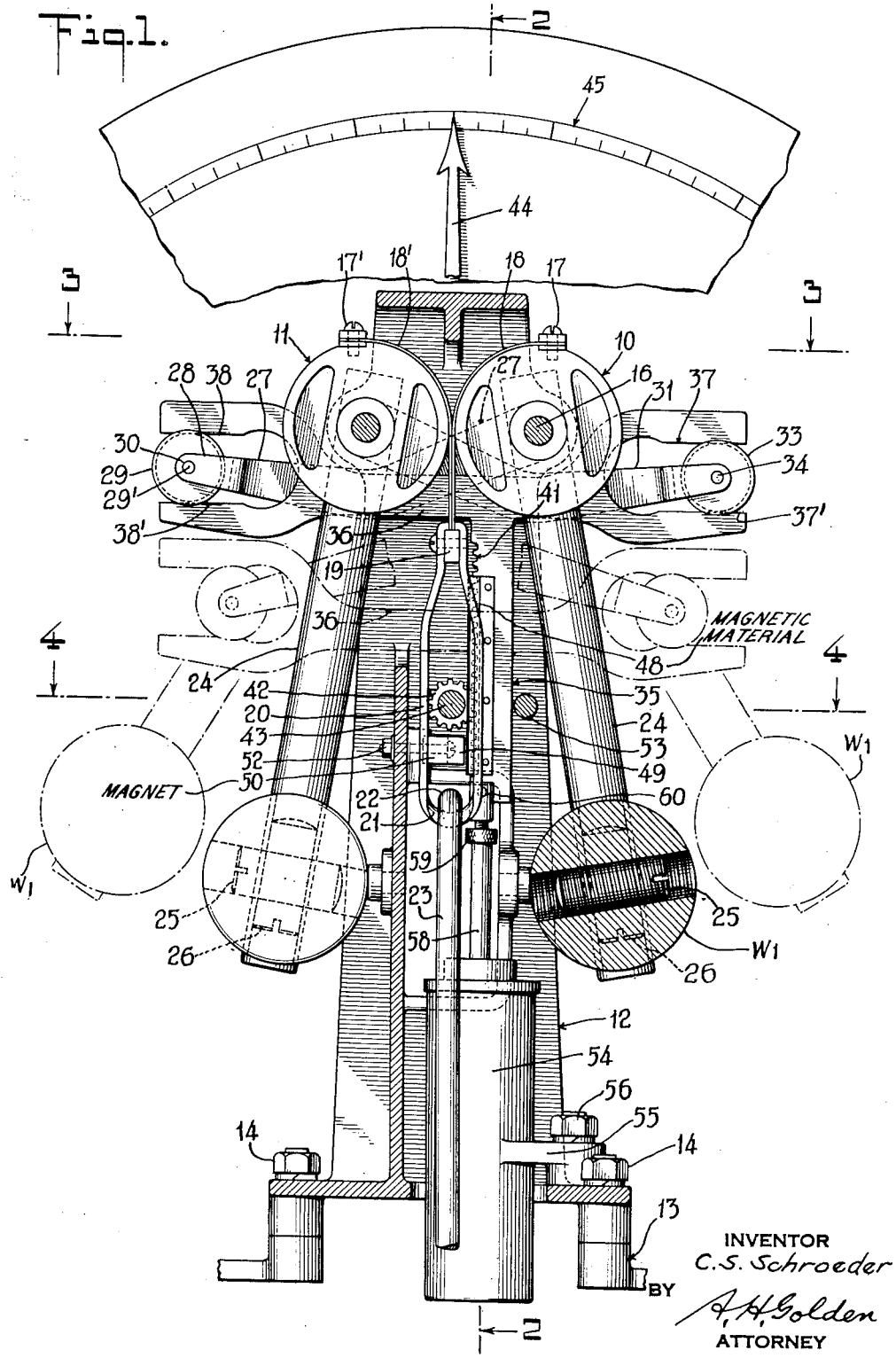
INVENTOR
C.S. Schroeder
BY
A.H.Golden
ATTORNEY

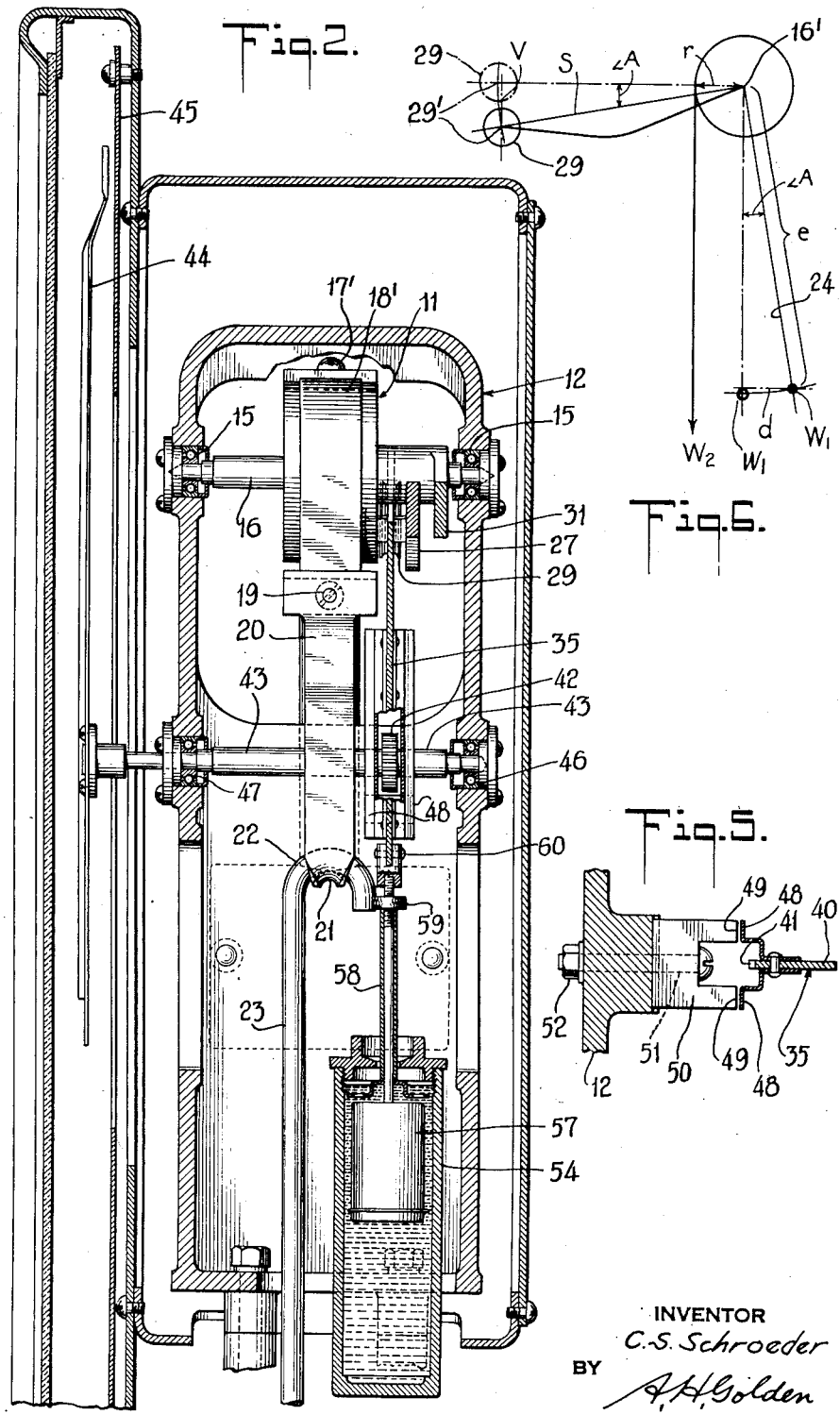

Nov. 18, 1952  C. S. SCHROEDER  2,618,476
PENDULUM SCALE
Filed Jan. 23, 1945  4 Sheets-Sheet 3
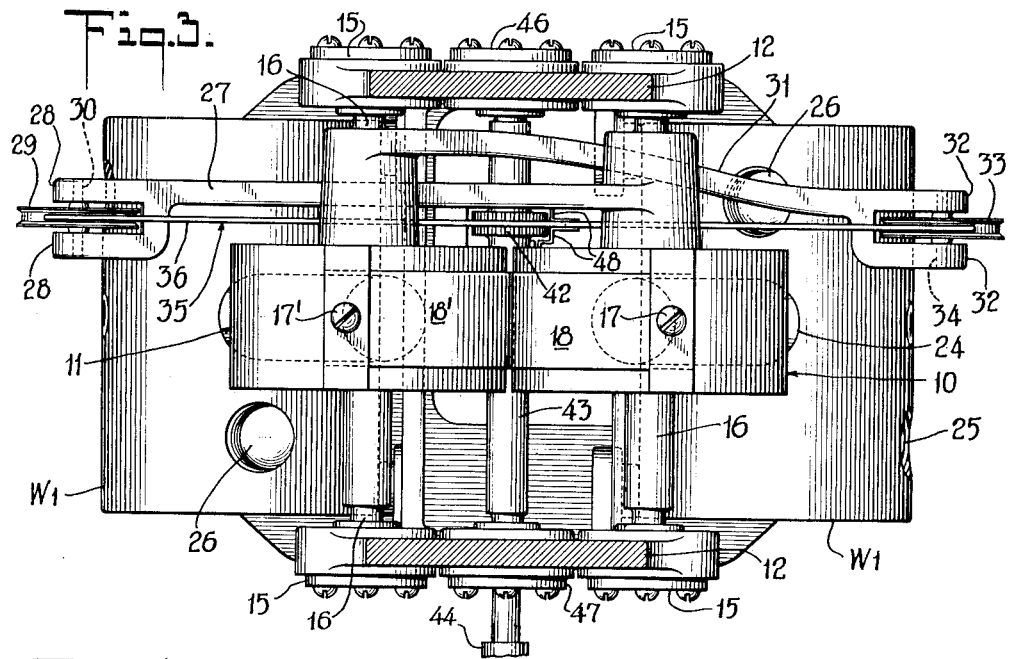
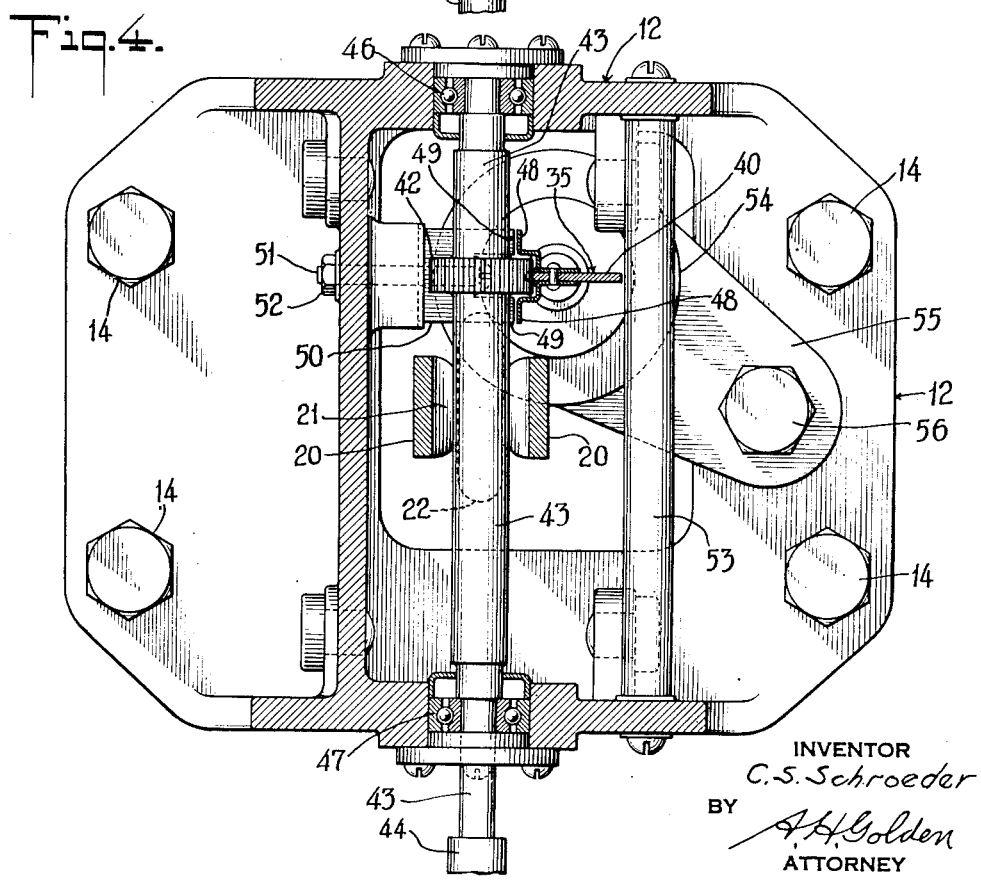
INVENTOR
C. S. Schroeder
BY
H. H. Golden
ATTORNEY Patented Nov. 18, 1952

2,618,476

UNITED STATES PATENT OFFICE 2,618,476

PENDULUM SCALE

Charles S. Schroeder, Philadelphia, Pa., assignor, by mesne assignments, to The Jacobs Bros. Co. Inc., New York, N. Y., a corporation of New York Application January 23, 1945, Serial No. 574,082

24 Claims. (Cl. 265—62)

This invention relates to a scale of the type in which a load to be weighed is adapted to move a weight responsive member. More particularly, this invention relates to a scale of the class described in which the weight responsive member is a pivoted pendulum, and most frequently, a pair of pivoted pendulums. It is customary in the art to apply the weight to the pendulums by means of bands attached to drums formed integrally with the pendulums and rotatable in the axis of rotation of the pendulums. In this way, the weight of the load is applied to the pendulums always at a fixed distance from the axis of rotation thereof.

It is customary, in scales of the class described, to use a rotating indicator hand, with this hand being rotated in response to the pivotal movement of the pendulums whereby to indicate the weight of the load that is applied to the pendulums. A direct connection between the indicator hand and the rotating pendulums will cause the indicator hand to move in uneven increments in response to even increments of weight, all as those skilled in the art fully appreciate. This form of movement of the indicator hand is very undesirable, it being generally preferred that the indicator hand move in even increments. In order to obtain this even movement of the indicator hand through rotation of the pendulums, one type of prior art structure utilizes a cam on one pendulum formed with a methematically determined curvature, this cam being adapted through a roller to move in even increments a pivoted gear sector that is in contact with a pinion fixed to the indicator hand.

While this arrangement is eminently satisfactory from an operating viewpoint, the cost of manufacture is relatively high because the formation of the mathematically determined cam surface is an extremely painstaking and difficult task. It is the object of my invention to operate an indicator hand in even increments through rotation of pendulums, without utilizing a mathematically determined cam surface.

In one form of prior art structure a mathematically determined cam surface of the type I have hereinabove described is eliminated by the utilization of compensating circular surfaces and by securing directly to the load-moving mechanism a rack that is in contact with a pinion fixed to the indicator hand. In this type of structure, the rack moves in direct proportion to the load applied to the pendulums, so that the consequent rotation of the indicator hand is in even increments. In such structures there arises the problem of how to effect movement of the indicator hand pinion by the rack without the setting up of considerable friction. This same problem arises in the structure that I have developed for eliminating the use of a methematically determined cam as hereinabove set forth.

In some prior art structures the rack is maintained against the pinion by use of an off-balanced weight. Unfortunately, this causes an uneven engagement of the rack and the pinion because the rack must necessarily move in varying directions relatively to the pinion, all as determined by the weight. This is more especially true where, as is highly desirable, the rack is free floating to eliminate friction.

A second form of structure for maintaining the rack against the indicator pinion utilizes a spring. This structure has the same inherent disadvantages as are found in the off-set weight structure. Many expedients have been tried in the prior art for effecting engagement of the rack with the pinion, and with the elimination of friction. One such expedient utilizes a rack that floats on a bath of mercury, the mercury level being such as to maintain the proper engagement between the rack and the indicator. This structure is not desirable because extreme accuracy of level of the mercury must be maintained, and because the rack must be driven directly by a gear sector or the equivalent thereof, thereby establishing another point at which error may occur.

It is important to note that in the designing of scales the very minimum of error must be provided for by the inherent design of the scale, so that such errors that do occur will be due merely to manufacturing tolerances. It is the object of my invention to provide such a scale. It is the further object of my invention to provide a novel and effective non-frictional means for maintaining in engagement an indicating rack and the pinion of an indicating hand, where the rack is preferably of the free floating type.

One feature of my invention whereby the objects thereof are obtained resides in the utilization of a free floating rack that is controlled in its movement by weight responsive means, and with the said weight responsive means being preferably a pendulum or pendulums.

As a further feature of the invention, the rack is preferably controlled through cam mechanism formed on the rack of a pair of pendulums, for controlling the movement of the rack. More particularly, this feature of my invention resides in the utilization of a gravity rack that moves vertically through its weight, with its vertical movement determined by the rotation of the pendulums under the influence of the load to be weighed.

A further feature of my invention resides in the utilization of magnetic means for maintaining the rack against the pinion. I have found through testing of an actual mechanism such as shown in this application, that a rack will be maintained by the magnetic means against the pinion with a minimum of friction, and with the engagement between the rack and pinion extremely accurate and uniform. As a further feature of this part of my invention, a magnet is used that is of the same width as that portion of the rack that is moved opposite the magnet during the vertical movement of the rack. Through this arrangement the lines of force of the magnet act to maintain the rack in a central predetermined position as determined by the location of the magnet itself.

A further feature of the invention resides in the utilization of fixed limit means for preventing the separation of the rack and pinion against the force of the magnetic means. Such separation may occur during acceleration of the rack, due to the camming action between its teeth and the teeth of the pinion. It is the function of the limit means to prevent an actual separation, the magnetic means functioning, of course, to maintain the rack and pinion in accurate and effective alignment.

A further feature of the invention resides in the utilization of an extremely thin rack so that teeth therof, if somewhat angularly positioned relatively to the pinion, will not set up inaccuracies and friction. Still a further feature of the invention resides in securing directly to the rack one part of a dash pot mechanism, thereby directly dampening any vibrations that may be set up in the rack. I have found that this arrangement contributes a much more quickly stabilized indication than other arrangements utilized in the prior art.

I have thus described generally the features of my invention and the relation of those features to prior art structures in order that the contribution of my invention to the scale art may be better appreciated. There are additional features of the invention that do not lend themselves to a general description, and those features will hereinafter be described in detail and will be set forth in the claims covering my invention. Naturally, those skilled in the art will readily understand that my contribution to the art may be utilized through the adoption of mechanical means other than the particular means I shall herein show and describe. It is, therefore, important that my invention be not limited to the particular mechanical structure that I have developed for contributing the results set forth.

In describing my invention hereinafter, I shall set forth certain theories of operation, and I shall prove mathematically certain facts. It is entirely possible, however, that the theories on which my invention is based may not be entirely accurate and I therefore do not wish the invention to be limited by those theories, since the structure that I have developed has actually been proven to be completely effective and to contribute the several results and features that I have already discussed generally and shall hereinafter set forth in considerable detail.

Referring now to the drawings, Fig. 1 is a vertical view of a scale mechanism embodying my invention, with only that portion of the scale mechanism that is new and novel being shown. Figs. 2, 3 and 4 are views taken, respectively, along lines 2—2, 3—3 and 4—4 of Fig. 1. Fig. 5 is a horizontal section taken immediately below the indicator pinion and illustrating the relationship of the magnetic means and the rack.

Fig. 6 is a diagrammatic showing of the structure of Fig. 1 for the purposes of proving that the vertical movement of the rack is directly proportional to the load being weighed; that is, the vertical movement of the rack is equal to the load being weighed multipled by a constant. Fig. 7 is a diagrammatic view of a modification of the structure of Figs. 1 to 5 inclusive, this figure being utilized for proving the operativeness of the particular modification.

Referring now more particularly to the drawings and more especially to Figs. 1 to 5 inclusive, I show there a right-hand pendulum 10 and a left-hand pendulum 11. These pendulums are supported for rotation on a main frame casting 12 that is in turn supported on the main body of the scale 13 by the usual bolts and nuts 14. As best seen in Fig. 2, the casting 12 has secured thereon at its opposite sides, ball bearings 15, there being one pair of said ball bearings for each pendulum. Each pendulum 10, 11 is formed with a shaft 16 whereby it is rotatably mounted on the said ball bearings 15.

The pendulum 10 has secured thereto through the stud 17 a steel band 18 that is secured at 19 to a coupler 20. The said coupler 20 is formed particularly at 21 for cooperation with a crook 22 formed on a bar 23 that extends upwardly from the usual load supporting platform. Through the said rod 23 and coupler 20, the band 18 rotates the pendulum 10 about the axis of its shaft 16, the angular rotation being balanced by the pendulum weight. This portion of my invention is, of course, well understood and known to those skilled in the art. Through a similar band 18' secured to the pendulum 11 at 17', the pendulum 11 is rotated by the load to be weighed.

The pendulum 10 is formed with an arm 24 carrying a weight that is adjustable through the utilization of movable screws 25 and 26. The pendulum 11 is similarly equipped with an arm 24 and a weight. Those skilled in the art will understand that the center of mass $W_1$ of each pendulum will be determined by the weight and form of each pendulum, and the influence of the parts moved thereby.

As is probably best seen in Figs. 1 and 3, the pendulum 10 is formed with an arm 27 extending toward the left and bifurcated at 28 for the support of a roller 29 through a shaft 30. Similarly, the pendulum 11 is formed with an arm 31 extending to the right and bifurcated at 32 for the support of a roller 33 through the shaft 34.

The rack of my invention is described generally by reference numeral 35 and is formed in the shape of a T. Its horizontally extending upper arm 36 terminates at its right end in a cam surface 37 and at its left end in a cam surface 38. It is the function of the cam surface 37 to rest on the roller 33, the cam surface 38 resting in turn on the roller 29. The horizontal arm 36 has formed thereon at its right end a limit surface 37' and at its left end a limit surface 38'. The surfaces 37' and 38' preferably do not contact the rollers 33 and 29, but lie in close juxtaposed relation thereto so as to limit the possible movement between the cam surfaces 37, 38 and rollers 33, 29.

Because of the particular arrangement, the rotation of the pendulums from their full line position of Fig. 1 to their dash and dotted line position under the influence of a load to be weighed, effects through gravity the downward vertical movement of the rack 35 from its full line position to its dash and dotted line position.

The rack 35 has a vertical part 40 on which are formed rack teeth 41 that are adapted for engagement with the teeth of a pinion 42. This pinion 42 is secured to rotate integrally with a shaft 43 that carries the indicator hand 44. In this way, vertical movement of the rack 35 effects rotation of the indicator 44 relatively to the indicator dial 45. It may be well at this point to indicate, through reference to Figs. 3 and 4, that the indicator carrying shaft 43 is supported on the casting 12 through ball bearings 46 and 47 mounted on parts of the said casting 12. It will further be noted that the rack 35 is extremely thin so that the teeth 41 will not affect consequentially the accurate rotation of the pinion 42 in the event that the rack becomes misaligned.

Secured to opposite sides of the vertical portion 40 of the rack 35 are flanges 48 formed preferably of ferrous sheet metal. These flanges are of sufficient length so that in all vertical positions of the rack 35, they lie opposite the faces 49 of a permanent magnet 50 secured to the casting 12 through the bolt 51 and nut 52. It is the function of the magnet 50, through its cooperation with the flanges 48, to urge the rack toward the pinion 42 so as to maintain the teeth 41 of the rack in engagement with the teeth of the pinion. The influence of the magnet is the same in all vertical positions of the rack 35 so that the coaction of the rack and pinion is substantially the same in all positions of the rack. There are therefore eliminated any variations in friction, tooth cooperation, etc., all as will be appreciated by those skilled in this art.

Because the width of the magnet 50, through its faces 49, is the same as the width of the flanges 48, the magnet acts to centralize the rack relatively to the magnet and therefore relatively to the pinion 42. This centralizing action is only possible when the magnet is of the same width as the flanges 48, as those skilled in the art will fully appreciate.

As was earlier set forth, limit means are provided for preventing separation of the rack teeth 41 from the pinion 42, such limit means comprising a rod 53 shown in section in Fig. 1 and in plan in Fig. 4. Normally, this rod 53 does not contact the rack, so that no friction is encountered at this point.

The cylinder 54 of an oil dash pot mechanism is formed with a bracket 55 whereby through a bolt 56 it may be secured to the casting 12. The piston of the dash pot is designated by reference numeral 57 in Fig. 2 and is formed with a shaft 58 adjustable through means 59 and secured at 60 directly to the rack 35. Because of this construction, the dash pot acts to dampen directly the movement of the rack 35 and therefore best functions to bring to a halt the reciprocating movement of the indicator hand 44.

Those skilled in the art will now fully appreciate that the vertical movement of the rack 35 will be changed to rotary movement of the indicator hand 44, and that this is accomplished through the free floating rack 35 in contact with pinion 42. If this vertical movement of the rack 35 is directly proportional to the load applied to the pendulums, then the rotary movement of the indicator hand 44 will be likewise directly proportional. Thus, if the vertical movement of the rack is equal to the load times a constant, then the rotary movement of the indicator hand 44 is likewise equal to the load multiplied by a constant. By reference to Fig. 6 I shall now proceed to prove that the vertical movement of the rack is equal to the load being weighed multiplied by a constant.

Referring to Fig. 6, $W_2$ equals the load to be weighed, while $W_1$ is the weight of the center of mass of one of the pendulums determined by its form and weight, and by the influence of the weight of the rack moved thereby. When this center of mass $W_1$ is immediately vertically below the center of rotation 16' of shaft 16, the center of roller 29 will be positioned on a line running from 16' at 90° to the line from 16' to the center of mass $W_1$. The distance between the center of rotation 29' of roller 29 and 16' equals a constant $S$, while the radius of application of the load to be weighed is at a distance $r$ from 16'. The distance from the center of mass $W_1$ to 16' equals $e$. Let us now consider that a load $W_2$ applied to the pendulums rotates one of the pendulums through an angle $A$.

Then $$W_1 d = W_2 r$$

and $$d = \frac{W_2 r}{W_1}$$

Now, since $r$ and $W_1$ are constants $$d = W_2 \text{ constant}_1 = W_2 C_1$$

It is also true that $$\frac{d}{e} = \sin A$$

If $V$ = the vertical displacement of rack 35, then it is also true that $$\frac{V}{S} = \sin A$$

$$\therefore \frac{V}{S} = \frac{d}{e}$$

and $$V = \frac{dS}{e}$$

Since $S$ and $e$ are constants, and since $d = W_2 C_1$ $$V = W_2 \text{ constant }_2 = W_2 C_2$$

It has now been proven that the vertical displacement (V) of the rack is directly proportional to the load to be weighed ($W_2$), it being equal to the weight of the said load multiplied by a constant.

In the modification of Fig. 1, it will be noted that when the center of mass $W_1$ is vertically disposed below the center of shaft 16, then a line from 29' to 16' is at right angles to the line running from 16' to the center of mass $W_1$. This is the preferred arrangement of my structure, and when this arrangement is utilized, the cam surfaces 37 and 38 of the rack are positioned horizontally. In other words, surfaces 37 and 38 are parallel to the lines in their respective pendulums extending from 29' to 16', when the pendulum centers of mass $W_1$ are vertically below the center of shaft 16.

I have found that if some angle other than 90° is selected as the angle between the line from 29' to 16' and the line from 16' to the center of mass W₁, then the cam surface 38 cooperating with roller 29 must still be parallel to the line running from 29' to 16' when the center of mass W₁ is vertically below the center of rotation of the pendulum. Naturally, some variation from this formula will not affect too greatly the accuracy of the scale, but I believe that the true mathematically accurate arrangement requires the angular relationship I have set forth.

In the modification of my invention illustrated in Fig. 7, I utilize a pendulum 65 having a center of mass P determined as in the first modification and at a distance $e$ from the center of rotation of the pendulum 65, designated by reference numeral 66, the load L being applied at a distance $b$ from the center 66. A roller 67 similar to one of the rollers 29, 33, is secured at the end of an arm 68 whose length is S. It will be remembered that in the first modification the rollers are positioned on a line from 16' at right angles to the line running to the center of mass W₁. In the modification of Fig. 7 the angle between the arm 68 and the line from 66 to the center of mass P is considerably larger than 90°, being equal to 90° plus angle R. It will be noted that the rack 35' in the modification of Fig. 7 is formed with a cam surface 38' equivalent to cam surface 38 of the first modification. However, this cam surface 38' is not positioned horizontally, but rather is positioned parallel to the line from the center 67' of roller 67 to the center 66 of rotation of pendulum 65.

I shall now prove mathematically that the vertical distance V moved by the rack 35' when the pendulum rotates through the angle A under the influence of a load L, is directly proportional to the weight of the load L. In other words, I shall prove that with the different angularity of the parts of Fig. 7, and provided that angularity is maintained, then the vertical movement of the rack is equal to the load being weighed multiplied by a constant. The proof follows:

In Fig. 7

$$\text{Angle } R = \text{angle } R_1$$
$$\text{Angle } A = \text{angle } A$$
$$y = y_1$$

If P is the weight of the center of mass of one of the pendulums, and we assume the use of but one pendulum, and if L is the load to be weighed, then:

$$Lb = Pd$$
$$d = \frac{Lb}{P}$$

Now, since $b$ and P are constants, $$d = L \text{ constant}_1 = LC_1$$

It is also true that $$d = e \sin A$$
$$\therefore Lb = Pe \sin A$$

We find also that $$\sin A = \frac{y}{s}$$

and since $$\sin A = \frac{d}{e}$$

Then, $$\frac{y}{s} = \frac{d}{e}$$

and $$y = \frac{sd}{e}$$

Now, since $d = LC_1$ and since $s$ and $e$ are constants, then $$y = L \text{ (constant}_2\text{)} = LC_2$$

angle $R_2$ = angle $R_1$ because the lines defining the angles are perpendicular to one another $$y_1 = y$$
$$\frac{y}{V} = \cos R_2$$
$$V = \frac{y}{\cos R_2}$$

Since $\cos R_2$ is constant, and since $y = LC_2$ $$V = L \text{ (constant}_3\text{)} = LC_3$$

It is believed that from the above it will be quite apparent that the vertical distance (V) the rack 35' moves is equal to the load to be weighed multiplied by a constant. It will, of course, be understood that in the modification of Fig. 7 the arrangement of the several mechanical parts is the same as that of the first modification with the exception of the angularities discussed. In other words, the magnetic control of the rack and the actuation of the rack is all as has been set forth. I believe that the construction and operation of my invention will now be apparent to those skilled in the art.

I now claim:

1. In a scale of the class described, a weight responsive member movable by a load to be weighed, a rack, means whereby movement of said weight responsive member effects movement of said rack, an indicator actuating pinion, and magnetic means spaced from said rack and through magnetism yieldingly maintaining said rack in engagement with said pinion in the several positions to which said rack is moved by said weight responsive member.

2. In a scale of the class described, a pair of pivoted weighted pendulums adapted to be rotated on their pivots by a load to be weighed, an arm extending from each of said pendulums, a rack, means whereby said arms effect movement of said rack vertically as said pendulums swing, an indicator actuating pinion, and magnetic means spaced from said rack and through magnetism yieldingly maintaining said rack in engagement with said pinion in the several vertical positions of said rack.

3. In a scale of the class described, a pair of pivoted weighted pendulums adapted to be rotated on their pivots by a load to be weighed, an arm extending from each of said pendulums, a rack having a pair of arms, means on each of said pendulum arms in cam relation to means on said rack arms whereby rotation of said pendulums moves said rack vertically, an indicator actuating pinion, and magnetic means yieldingly maintaining said rack in engagement with said pinion in the several vertical positions of said rack.

4. In a scale of the class described, a pair of pivoted weighted pendulums adapted to be rotated on their pivots by a load to be weighed, an arm extending from each of said pendulums, a rack having a pair of arms, means on each of said pendulum arms in camming relation to means on each of said rack arms, the means on each of said arms being positioned on a line extending from the pivot point of the particular pendulum at 90° from a line running from the center of mass of the pendulum weight to the said pivot point, the rotation of said pendulum through said means effecting movement of said rack, an indicator actuating pinion, and magnetic means yieldingly maintaining said rack in engagement with said pinion in the several vertical positions of said rack.

5. In a scale of the class described, a pair of pivoted weighted pendulums adapted to be rotated on their pivots by a load to be weighed, an arm extending from each of said pendulums, a roller on each of said arms, each roller being positioned on its arm on a line from the pivot point of the particular pendulum at 90° from a line running from the center of mass of the pendulum weight to the said pivot point, a rack having a pair of spaced cams in cam and roller engagement with said rollers whereby rotation of said pendulums moves said rack vertically, an indicator actuating pinion, and magnetic means yieldingly maintaining said rack in engagement with said pinion in the several vertical positions of said rack.

6. In a scale of the class described, a pair of pivoted weighted pendulums adapted to be rotated on their pivots by a load to be weighed, an arm extending from each of said pendulums, a roller on each of said arms, a rack having a pair of spaced cams in cam and roller engagement with said rollers whereby rotation of said pendulums effects movement of said rack vertically, an indicator actuating pinion, and magnetic means yieldingly maintaining said rack in engagement with said pinion in the several vertical positions of said rack.

7. In a scale of the class described, a frame, a pair of pivoted weighted pendulums, pivot shafts whereby said pendulums are rotated on said frame by a load to be weighed, an arm extending from each of said pendulums, a roller on each of said arms, each roller being positioned on its arm on a line from the pivot point of the particular pendulum at 90° from a line running from the center of mass of the pendulum weight to the said pivot point, a rack having a pair of spaced cams in cam and roller engagement with said rollers whereby rotation of said pendulums moves said rack, an indicator actuating pinion, and said rack being in operative engagement with said pinion.

8. In a scale of the class described, a frame, a pair of pivoted weighted pendulums, pivot shafts bearing on said frame and whereby said pendulums are rotated relatively to said frame by a load to be weighed, an arm extending from each of said pendulums, a roller on each of said arms, a rack having a pair of spaced cams in cam and roller engagement with said rollers whereby rotation of said pendulum moves said rack, an indicator actuating pinion, and said rack being in operative engagement with said pinion.

9. In a scale of the class described, a pair of pivoted weighted pendulums, means whereby said pendulums are rotated by a load to be weighed, a gravity rack, a pair of linear surfaces and a pair of circular means on said pendulums and rack cooperating to support said rack relatively to said pendulums whereby said rack follows the vertical movement of part of said pendulums when said pendulums rotate, an indicator actuating pinion, and magnetic means yieldingly maintaining said rack in engagement with said pinion in the several vertical positions of said rack.

10. In a scale of the class described, a pair of pivoted weighted pendulums adapted to be rotated on their pivots by a load to be weighed, an arm extending from each of said pendulums, a roller on each of said arms, each roller being positioned on its arm on a line from the pivot point of the particular pendulum at 90° from a line running from the center of mass of the pendulum weight to the said pivot point, a rack having a pair of spaced cams whereby it is supported on said rollers against vertical gravitational movement and follows said rollers as the pendulums are rotated by a load, an indicator actuating pinion, and magnetic means yieldingly maintaining said rack in engagement with said pinion in the several vertical positions of said rack.

11. In a scale of the class described, a frame, a pair of pivoted weighted pendulums, pivot shafts whereby said pendulums rotate relatively to said frame by a load to be weighed, an arm extending from each of said pendulums, a roller on each of said arms, a rack, a pair of spaced cams supporting said rack on said rollers against vertical gravitational movement for following said rollers as the pendulums are rotated by a load, an indicator actuating pinion, and magnetic means yieldingly maintaining said rack in engagement with said pinion in the several vertical positions of said rack.

12. In a scale of the class described, a pair of pivoted weighted pendulums adapted to be rotated on their pivots by a load to be weighed, a gravity rack, spaced means on said rack resting on support means on each of said pendulums for supporting said rack and whereby said rack follows the vertical movement of said support means as said pendulums are rotated by a load, an indicator actuating pinion, and magnetic means yieldingly maintaining said rack in engagement with said pinion in the several vertical positions of said rack.

13. In a scale of the class described, a pair of pivoted weighted pendulums adapted to be rotated on their pivots by a load to be weighed, an arm extending from each of said pendulums, a rack having a pair of arms, means on each of said pendulum arms in support relation to said rack arms for supporting said rack against gravitational movement whereby said rack follows the movement of said pendulum arms as the pendulums are rotated by a load, an indicator actuating pinion, and magnetic means yieldingly maintaining said rack in engagement with said pinion in the several vertical positions of said rack.

14. In a scale of the class described, a pair of pivoted weighted pendulums, means whereby said pendulums are rotated by a load to be weighed, an arm extending from each of said pendulums, a gravity rack, spaced means on said rack resting on said arms for supporting said rack and whereby said rack follows the vertical movement of said pendulum arms incidental to the rotation of said pendulums by a load, an indicator actuating pinion, and magnetic means yieldingly maintaining said rack in engagement with said pinion in the several vertical positions of said rack.

15. In a scale of the class described, a pair of pivoted weighted pendulums adapted to be rotated on their pivots by a load to be weighed, a rack, a pair of linear surfaces on said rack resting on circular means on each of said pendulums for supporting said rack and whereby said rack follows the vertical movement of said circular means, each of said surfaces lying parallel to a line extending from the center of rotation of one pendulum to the center of said circular means when the center of mass of said pendulum is vertically disposed relatively to the center of rotation of said pendulum, an indicator actuating pinion, and magnetic means yieldingly maintaining said rack in engagement with said pinion in the several vertical positions of said rack.

16. In a scale of the class described, a pair of pivoted weighted pendulums adapted to be rotated on their pivots by a load to be weighed, an arm extending from each of said pendulums, a roller on each of said arms, a gravity rack, a pair of linear surfaces on said rack with one of said surfaces resting on each of said rollers whereby said rack follows the vertical movement of said rollers as said pendulums are rotated by a load, each of said surfaces lying parallel to a line extending from the center of rotation of one pendulum to the center of its roller when the center of mass of said pendulum is vertically disposed relatively to the center of rotation of said pendulum, an indicator actuating pinion, and magnetic means yieldingly maintaining said rack in engagement with said pinion in the several vertical positions of said rack.

17. In a scale of the class described, a frame, a pair of pivoted weighted pendulums, pivot means whereby said pendulums are rotated relatively to said frame by a load to be weighed, a gravity rack, a pair of linear surfaces on said rack resting on circular means on each of said pendulums for supporting said rack and whereby said rack follows the vertical movement of said circular means, each of said surfaces lying parallel to a line extending from the center of rotation of one pendulum to the center of said circular means when the center of mass of said pendulum is vertically disposed relatively to the center of rotation of said pendulum, an indicator actuating pinion, and said rack having teeth in driving engagement with said pinion.

18. In a scale of the class described, a pair of pivoted weighted pendulums adapted to be rotated on their pivots by a load to be weighed, a rack, a pair of linear surfaces on said rack contacting circular means on each of said pendulums whereby said rack follows the vertical movement of said circular means, each of said surfaces lying parallel to a line extending from the center of rotation of one pendulum to the center of said circular means when the center of mass of said pendulum is vertically disposed relatively to the center of rotation of said pendulum, an indicator actuating pinion, and magnetic means yieldingly maintaining said rack in engagement with said pinion in the several vertical positions of said rack.

19. In a scale of the class described, a frame, a pair of pivoted weighted pendulums, pivot means whereby said pendulums are rotated relatively to said frame by a load to be weighed, an arm extending from each of said pendulums, a roller on each of said arms, a rack having a pair of spaced linear surfaces cooperable with said rollers whereby rotation of said pendulums effects the movement of said rack vertically, each of said surfaces lying parallel to a line extending from the center of rotation of one pendulum to the center of its roller when the center of mass of said pendulum is vertically disposed relatively to the center of rotation of said pendulum, an indicator actuating pinion, and teeth on said rack in engagement with teeth of said pinion for rotating said pinion.

20. In a scale of the class described, a weight responsive member movable by a load to be weighed, a rack, means whereby movement of said weight responsive member effects movement of said rack, an indicator actuating pinion in engagement with the teeth of said rack, magnetic means yieldingly maintaining said rack in engagement with said pinion in the several vertical positions of said rack, and limit means spaced from said rack for preventing disengagement of the teeth of said rack from said pinion against the yielding force of said magnetic means.

21. In a scale of the class described, a pair of pivoted weighted pendulums, means whereby said pendulums are rotated by a load to be weighed, a rack having teeth formed on a part thereof, means whereby pivotal movement of said pendulums effects movement of said rack, an indicator actuating pinion, a magnet positioned to urge said rack against said pinion, and said magnet being of the same width as that portion of said rack moving opposite said magnet for yieldingly urging said rack against said pinion in all actuated positions of said rack, said magnet because of its width acting yieldingly also to align said rack relatively to said pinion as the said rack moves vertically to rotate said pinion.

22. In a scale of the class described, a weight responsive member movable by a load to be weighed, a rack having teeth formed on a part thereof, means whereby movement of said weight responsive member effects movement of said rack, an indicator actuating pinion, a magnet positioned to urge said rack against said pinion, and said magnet being of the same width as that portion of said rack moving opposite said magnet for yieldingly urging said rack against said pinion in all actuated positions of said rack, said magnet because of its width acting yieldingly also to align said rack relatively to said pinion as the said rack moves vertically to rotate said pinion.

23. In a scale of the class described, a pair of pivoted weighted pendulums adapted to be rotated on their pivots by a load to be weighed, an arm extending from each of said pendulums, a roller on each of said arms, each roller being positioned on its arm on a line from the pivot point of the particular pendulum at 90° from a line running from the center of mass of the pendulum weoight to the said pivot point, a rack having a pair of spaced cams whereby it is supported on said rollers against vertical gravitational movement and through gravity follows said rollers as the pendulums are rotated by a load, an indicator actuating pinion, and magnetic means yieldingly maintaining said rack in engagement with said pinion in the several vertical positions of said rack, said magnetic means being substantially the same width as said rack whereby to align said rack yieldingly relatively to a predetermined vertical plane as the rack moves vertically to rotate said pinion.

24. In a scale of the class described, a frame, a pair of pivoted weighted pendulums, pivot means whereby said pendulums are rotated relatively to said frame by a load to be weighed, a gravity rack, linear surfaces and circular means positioned on said pendulums and said gravity rack for supporting said rack on said pendulums and whereby said rack is moved as said pendulums rotate on their pivots in response to a load being weighed, each of said surfaces lying parallel to a line extending from the center of rotation of one pendulum to the center of said circular means when the center of mass of said pendulum is vertically disposed relatively to the center of rotation of said pendulum, an indicator actuating pinion, and said rack having teeth in driving engagement with said pinion.

CHARLES S. SCHROEDER.

REFERENCES CITED

The following references are of record in the file of this patent:

UNITED STATES PATENTS

| Number | Name | Date |
|---|---|---|
| 1,205,691 | Wetzel | Nov. 21, 1916 |
| 1,254,369 | Simonsson | Jan. 22, 1918 |
| 1,352,097 | Sonander | Sept. 7, 1920 |
| 1,447,307 | Hopkinson | Mar. 6, 1923 |
| 1,453,353 | Hem | May 1, 1923 |
| 1,542,244 | Hem | June 16, 1925 |
| 1,591,284 | Christopherson et al. | July 6, 1926 |
| 1,936,208 | Pitt | Nov. 21, 1933 |